July 15, 1958 D. S. MARDEN 2,843,353
BUTTERFLY VALVE SEAL
Filed April 23, 1954
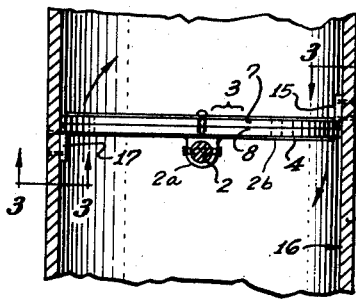
Fig. 1
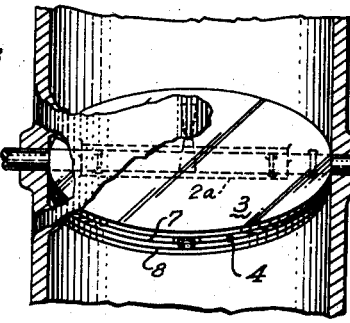
Fig. 2
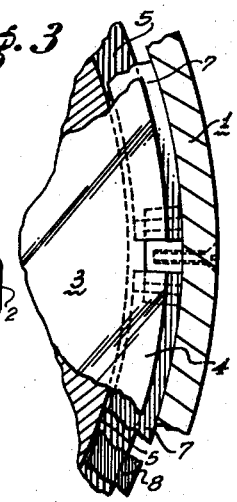
Fig. 3
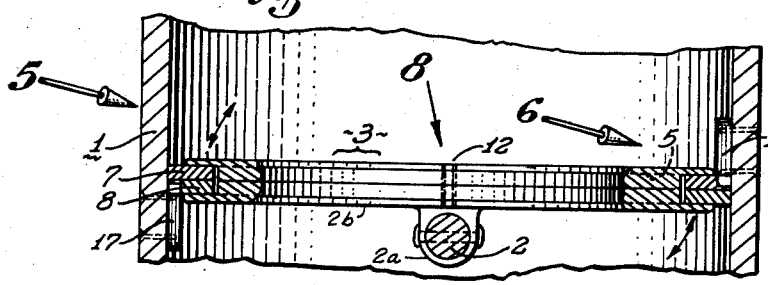
Fig. 4
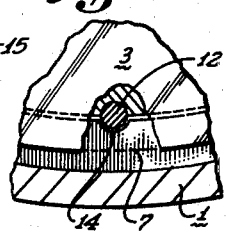
Fig. 8
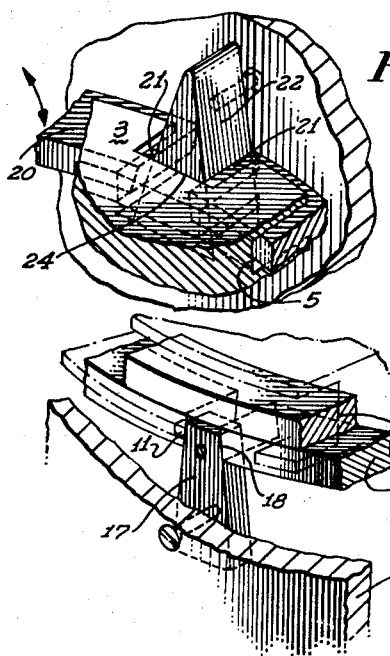
Fig. 7
Fig. 5
Fig. 6
INVENTOR:
Donald S. Marden
By Hubert E. Metcalf
His Patent Attorney United States Patent Office 2,843,353
Patented July 15, 1958

2,843,353

BUTTERFLY VALVE SEAL

Donald S. Marden, Manhattan Beach, Calif., assignor to Northrop Aircraft, Inc., Hawthorne, Calif., a corporation of California Application April 23, 1954, Serial No. 425,098

3 Claims. (Cl. 251—192)

My invention relates to butterfly valves and more particularly to a butterfly valve providing a positive seal when closed.

Among the objects of my invention are:

To provide a butterfly valve for a fluid carrying conduit that provides a positive seal and yet is easy to open and close.

To provide a butterfly valve seal effective to compensate for wear.

To provide a butterfly valve having an expandible seal effective to perform efficiently over a long period of operation.

Briefly stated, my invention comprises a sealing ring having its ends spaced apart inserted in the periphery of a butterfly valve disc. The ring diameter normally is slightly smaller than the diameter of the conduit in which the valve is inserted. A wedge shaped projection is positioned on the inner wall of the conduit to enter between the spaced apart ends of the ring and expand the ring against the inner wall as the disc reaches the closed position. Both one and two ring embodiments are used.

This application is a continuation-in-part of my prior application Serial No. 355,601, filed May 18, 1953, now abandoned.

My invention will be described by a description of two embodiments thereof as shown in the drawings, in which:

Figure 1 is a longitudinal sectional view of a valve mounted in a conduit with the disc shown in elevation in closed position.

Figure 2 is a similar view taken at a right angle to the view of Figure 1, showing the valve disc partly open.

Figure 3 is a view, partly in section and partly in elevation of a portion of Figure 1 taken at the areas indicated by the lines 3—3 in Figure 1, but showing the valve disc modified by the provision of cutouts to accommodate thicker wedges.

Figure 4 is an enlarged view, partly in section and partly in elevation, showing the split ring mounting.

Figure 5 is a perspective view from inside the conduit, showing how a wedge shaped projection expands an upper ring.

Figure 6 is a cutaway perspective view from outside the conduit, showing how a projection expands a lower ring.

Figure 7 is a perspective sectional view showing a single split ring seal.

Figure 8 is a sectional cutaway view showing how the rings are prevented from rotation in the groove.

Referring first to Figures 1 and 2, the conduit 1 is provided with a shaft 2 extending diametrically therethrough, to which is attached a valve disc 3 slightly smaller in diameter than the internal diameter of the conduit 1. Shaft 2 is attached by means of a shaft support 2a mounted transversely across one face 2b of valve disc 3 so as not to interrupt the peripheral edge 4 of the disc 3. Shaft 2 is journalled at each end thereof in opposite walls of the conduit 1 in any convenient manner. Disc 3 is provided with a peripheral groove 5 in which are positioned two split sealing rings 7 and 8, these rings having their respective ends 10 and 11 spaced apart and located 180° apart in the groove as best shown in Figures 5 and 6. The rings 7 and 8 are made to have a sealing fit in the groove 5 and each has a normal diameter slightly less than that of the internal diameter of the conduit 1 and are formed of resilient material such as piston ring steel, for example. Each ring is prevented from rotating in the groove 5 by a key pin 12 in disc 3 90° away from the spaced ends, for example this key pin partially entering a key pin slot 14 in the ring, the diameter of which is somewhat greater than that of the pin, as best shown in Figure 8. These key pins prevent peripheral rotation of the rings, but permit the small lateral movement and outward movement of the ring necessary for the seal, as will later be described.

As best shown in Figures 1 and 4, a first wedge shaped projection 15 is fastened to the inner wall 16 of the conduit 1 on one side of disc 3, and a second projection 17 is fastened to the inner wall 16 of the conduit 1 on the other side of disc 3. These projections are 180° apart and have their small ends directed to enter between the spaced ends of the ring nearest them as the disc is turned toward sealing position, which is with the disc plane substantially at a right angle to the horizontal axis of conduit 1. The end surfaces of the split ring ends 10 and ends 11 are preferably beveled to the same angle as that of the projection surfaces contacting these ends, so that a face-to-face seal is made as the wedging action of the projections forces the ends of the rings apart, thereby expanding the rings against the inner wall 16 of the conduit 1, thus providing a tight locking seal as shown in Figures 5 and 6. When the disc 3 is turned away from locking position, the spaced ends 10 and ends 11 are withdrawn from wedges 15 and 17 and the rings contract to their original diameter so that the disc can be easily turned to open positions. The small ends of the wedge shaped projections 15 and 17, when the disc is fully closed, terminate short of contact with the other ring, thereby providing some leeway for take up of wear in the ring seals. By placing the projections apart, preferably 180° apart, any leakage past the periphery of the disc between the disc periphery and the inner face of a projection 15 or 17 is stopped by the other ring in each case, and a complete 360° ring expansion seal is provided. Thus these projections 15 and 17 in this embodiment do not have to extend inwardly to contact the periphery of disc 3. Such a valve has been found highly successful for sealing off hot air, for example, in conduits carrying 3000 to 5000 p. s. i.

However, a single ring seal has been found satisfactory for lower pressures, constructed as shown in Figure 7. Here, disc 3 is provided with groove 5 containing only a single ring 20. Spaced ends 21 of this ring 20 are positioned to be forced apart by a single wedge 22 and the ends 21 are preferably beveled as in the rings previously described. In this particular embodiment, wedge 22 extends inwardly beyond the periphery 4 of the disc 3, the disc 3 being provided with a cut-away portion 24 into which the disc ends 21 project. This cut-away portion, however, preferably does not extend all the way inwardly to the bottom of groove 5. In this embodiment, a ring seal is provided with the walls of the conduit to the extent of the ring periphery, the seal between the ring ends 21 wherein the wedge 22 is projected inwardly to contact the groove walls above and below the ring, when the disc is in sealing position. The distance between the ring ends is preferably made relatively small with respect to the peripheral extent of the ring. The single ring of the embodiment of Figure 7 is prevented from rotation in groove 5 by a disc pin 12 and ring groove 14 as shown in Figure 8.

While in order to comply with the statute, the invention has been described in language more or less specific as to structural features, it is to be understood that the invention is not limited to the specific features shown, but that the means and constructon herein disclosed comprises a preferred form of putting the invention into effect, and the invention is therefore claimed in any of its forms or modifications within the legitimate and valid scope of the appended claims.

What is claimed is:

1. A butterfly valve for a fluid carrying conduit comprising: a valve disc the outside diameter of which is smaller than the inside diameter of said conduit, pivotal support means supporting said valve disc in the interior of said conduit so that the entire peripheral edge of said disc is free and unincumbered, said valve disc being pivotal on said support means from a position wherein the interior of said conduit is open to fluid flow to a position wherein said conduit is closed to fluid flow, a groove in the peripheral edge of said valve disc and extending entirely around the circumference thereof, a pair of resilient split sealing rings mounted in said groove with the spaced apart ends of one of said rings rotated in said groove 180° away from the spaced apart ends of the other said ring, the outside diameter of said rings being normally smaller than the inside diameter of said conduit, coupling means engaging the inside periphery of said rings and said disc to prevent relative rotation of said rings in said peripheral groove, and ring expansion means mounted on the interior wall surface of said conduit, said expansion means being located and shaped to enter between said spaced ends of said split rings when said valve disc is pivoted to said position closing said conduit to fluid flow to expand said rings into fluid tight engagement around the entire circumference of the interior wall of said conduit.

2. A butterfly valve for a fluid carrying conduit comprising: a valve disc the outside diameter of which is smaller than the inside diameter of said conduit, a shaft support member mounted transversely across one face of said valve disc and spaced away from the peripheral edge of said valve disc so that said peripheral edge of said valve disc is unincumbered, a pivotal shaft extending through said shaft support and journalled in opposite sides of said conduit, said valve disc being pivotally movable with said shaft from a horizontal position in said conduit thereby to permit free flow of fluid through said conduit to a vertical position in total opposition to the flow of fluid through said conduit, a groove in the peripheral edge of said valve disc and extending entirely around the circumference thereof, a pair of resilient split sealing rings mounted side by side in said groove with the spaced apart ends of one of said rings rotated in said groove 180° away from the spaced apart end of the other said ring, the outside diameter of said rings being normally smaller than the inside diameter of said conduit, key pin slots extending through a portion of said rings between the inside diameter thereof and the bottom of said groove, key pins extending through said valve disc and key pin slots to prevent relative rotation of said rings in said peripheral groove, ring expansion means mounted on the interior wall surface of said conduit, said expansion means being located and shaped to enter between said spaced ends of said split sealing rings when said valve disc is pivoted to said fluid opposing vertical position in said conduit to force said spaced ends in opposite directions and expand said rings into fluid tight sealing engagement with the interior wall surface of said conduit around the entire circumference thereof.

3. Apparatus in accordance with claim 2 wherein said ring expansion means are wedge shaped members mounted on the interior wall of said conduit located and positioned with their apices directed toward the respective spaced ends of said split sealing rings so that when said valve disc is pivoted to said vertical position to totally oppose fluid flow through said conduit said apices of said members will enter between said spaced ends of said split sealing rings to expand said rings into fluid tight engagement with the interior wall of said conduit around the entire circumference of said valve disc.

References Cited in the file of this patent

UNITED STATES PATENTS

| Re. 4,043 | Rock | June 21, 1870 |
| 1,188,462 | McCormack | June 27, 1916 |
| 1,858,587 | Grant | May 17, 1932 |
| 2,054,064 | Anderson | Sept. 15, 1936 |
| 2,058,996 | Kollberg | Oct. 27, 1936 |
| 2,346,052 | Seamark | Apr. 4, 1944 |
| 2,586,927 | Fantz | Feb. 26, 1952 |